(12) United States Patent
Eyer

(10) Patent No.: US 6,483,547 B1
(45) Date of Patent: Nov. 19, 2002

(54) TRANSMISSION SIGNAL ID FOR ANALOG TELEVISION BROADCASTS

(75) Inventor: Mark K. Eyer, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/034,034

(22) Filed: Mar. 3, 1998

(51) Int. Cl.$^7$ .............................. H04N 7/08; H04N 5/445
(52) U.S. Cl. ....................... 348/473; 348/731; 348/554; 370/487; 725/38
(58) Field of Search ................................. 348/725, 553, 348/731, 468, 554, 465, 469, 473, 569; 725/38, 39, 48, 59; 345/721, 708; 370/343, 437, 480, 485–487

(56) References Cited

U.S. PATENT DOCUMENTS

| 5,600,378 A | * | 2/1997 | Wasilewski | 348/468 |
| 5,734,589 A | * | 3/1998 | Kostreski et al. | 364/514 A |
| 5,818,438 A | * | 10/1998 | Howe et al. | 345/327 |
| 5,850,218 A | * | 12/1998 | LaJoie et al. | 345/327 |
| 5,982,413 A | * | 11/1999 | Irie et al. | 348/7 |
| 6,115,074 A | * | 9/2000 | Ozkan et al. | 348/465 |
| 6,163,316 A | * | 12/2000 | Killian | 345/327 |
| 6,378,130 B1 | * | 5/2002 | Adams | 725/95 |

* cited by examiner

Primary Examiner—Victor R. Kostak
(74) Attorney, Agent, or Firm—Barry R. Lipsitz; Douglas M. McAllister

(57) ABSTRACT

A received analog television service is positively identified using a transmission signal identifier that is inserted into the analog signal at the transmitter side, and extracted at the receiver side. Channel map data which is used for identifying counterpart digital programming services is extended to encompass identification of the analog services. Descriptive information which is specific to the programming services, such as program guide data, can thereby be accurately matched up and displayed with a received analog programming service.

18 Claims, 2 Drawing Sheets

TRANSMISSION SIGNAL ID FOR ANALOG TELEVISION BROADCASTS

BACKGROUND OF THE INVENTION

The present invention relates to a method and apparatus for enabling the unambiguous identification of an analog television signal, and more particularly to the provision of tag data in a blanking interval of the analog television signal to associate the signal with information such as a channel name and number, program title and schedule information. The identifying information can then be decoded and displayed on a viewer's television set. The invention is particularly suited for use with digital television receivers that are also capable of receiving analog television signals, and which include look up tables for identifying received television services and/or program guide data.

The following terms are defined:
ATSC—Advanced Television Systems Committee;
ATSC A/65—"Program and System Information Protocol for Terrestrial Broadcast and Cable" standard of the ATSC;
DTV—Digital Television;
EIA—Electronic Industries Association;
EIA-608—EIA Standard "Recommended Practice for Line 21 Data Service," ANSI/EIA-608-1994, September 1994, Arlington, Va.; see also "SP-3688-1 Changes to EIA-608," Apr. 19, 1996;
EPG—Electronic Program Guide;
EIT—Event Information Table;
ETT—Event Text Table;
MPEG—Moving Picture Experts Group;
N3—Naming, Numbering and Navigation;
NTSC—National Television Systems Committee;
PSIP—Program and System Information Protocol
TSID (digital)—Transport Stream ID (MPEG);
TSID (analog)—Transmission Signal ID;
VBI—Vertical Blanking Interval;
VCT—Virtual Channel Table;
CVCT—Cable VCT
TVCT—Terrestrial VCT; and
XDS (or EDS)—Extended Data Service.

Recently, there has been a rapid increase in the number of available television channels due to the advent of digital television transmission schemes such as MPEG-2 and Digicipher® II, the latter of which is proprietary to General Instrument Corporation, the assignee of the present invention. Background information for the MPEG-2 standard may be found in document ISO/IEC 13818-1 (MPEG-2), entitled "Generic Coding of Moving Pictures and Associated Audio", Part 1 (Systems), July, 1995, now ITU-T Recommendation H.222.0.

Digital compression techniques allow more than one television signal to fit into the transmission bandwidth occupied by a single analog transmission. In fact, with proposed schemes, up to ten or more standard definition television (SDTV) channels, or two high definition television (HDTV) channels can fit into the 6 MHz bandwidth which conventionally carries only one analog television channel.

At the present time, broadcasters have begun to augment their existing analog equipment to provide digital signal transmission, and television viewers will soon have the opportunity receive such signals by purchasing a new digital television receiver. Since it will obviously take an extended period of time to phase digital television into the mainstream and to phase analog television out, there will be many years where the provision of both analog and digital television will overlap.

Accordingly, there has been significant interest in television communication schemes where some of the channel allocations are used to provide digital television signals, while other allocations carry analog signals. The ATSC Digital Television System defined according to the ATSC A/65 Program and System Information Protocol is one such scheme. Background information may also be found in the document "System Information for Digital Television—ATSC Standard", Doc. A/56. Jan. 3, 1996, Advanced Television Systems Committee. Such schemes are expected to provide a transition to an all-digital system by allowing terrestrial broadcasters and cable television system operators to continue transmitting their conventional analog television channel(s) while concurrently transmitting one or more new digital channels.

Although a digital receiver may use a digital signal's TSID as defined in the MPEG-2 Systems standard to unambiguously identify the digital signal, prior to the present invention no equivalent ID tag was defined in the analog domain. Consequently, it has not been possible for receivers to positively identify each analog channel. As a result, digital data which is associated with the analog channel, such as channel name (e.g., station identifier), channel number, and program guide data, may be incorrect, thereby confusing the viewer. In particular, an analog channel which is not the one that would be expected to be recovered from a pre-assigned channel frequency may be received due to weather conditions, terrain, geographic location or antenna orientation, for example.

Accordingly, it would be advantageous to provide a system for positively and unambiguously identifying analog television services. It would be further advantageous to use the identification data to access information about the analog service, e.g., by reference to an appropriate look up table stored in the television receiver. Examples of such look up tables include a TVCT for providing channel name and number, an EIT to provide program titles and schedules, and an ETT for providing text, e.g., program descriptions. The data stored in the TVCT could then be used to provide an information display to the television viewer about the analog service, comparable to the information provided about digital television services through the use of a digital VCT.

The present invention provides a system having the above and other advantages.

SUMMARY OF THE INVENTION

The present invention relates to a method and apparatus for accurately and unambiguously identifying an analog television signal received via a terrestrial broadcast. In particular, the invention addresses the problem of naming, numbering and navigating (N3) where virtual channel tables (VCTs) are used to map user channels (e.g., programming services) to physical characteristics.

A terrestrial broadcast receiver obtains VCTs by acquiring digital transport streams and storing the VCT data carried in the transport stream. Each digital transport stream is assumed to be identified by a unique tag, such as transport_stream_ID (TSID) used in the MPEG-2 standard. A receiver may use the TSID by finding a transport stream and navigating using a VCT for that digital TSID.

As discussed herein, a VCT can be used to reference analog channels in addition to digital channels. A digital transport stream identifies itself by means of its digital TSID. The VCT references a given analog channel only by its frequency, so that if an analog channel other than the one referenced is actually received on that frequency, erroneous information will be provided to the viewer about the analog service actually received.

In accordance with the present invention, an equivalent tag to the digital TSID is supplied within the analog waveform. This analog tag is referred to herein as an analog TSID (transmission signal identifier), in contrast to a digital TSID (transport stream identifier), and can be carried, for example, in a blanking interval (horizontal or vertical) of the analog television signal.

A method in accordance with the invention unambiguously identifies an analog television programming service which is communicated from a transmitter to a receiver. A transmission signal identifier is assigned to the analog programming service. This identifier may comprise, for example, a field of bits that is sufficiently long to provide the necessary unique identifying information. In one embodiment, a 16-bit field is used, although it will be appreciated that the invention is by no means limited to any specific number of bits used to provide the transmission signal identifier. Independently of the analog service, channel data is provided which correlates the analog transmission signal identifier to at least one service characteristic, such as the channel name, the title of the particular program event (e.g., television program title), and/or schedule information. The channel data may comprise, for example, data stored in a channel map, plus program event data stored in an electronic program guide (EPG) database (e.g., EIT and ETT).

The transmission signal identifier is inserted into the analog programming service (e.g., in the vertical blanking interval) for communication with the analog programming service to the receiver. The channel data is also communicated to the receiver, e.g., in a separate digital multiplex that also carries one or more digital television services.

At the receiver, the transmission signal identifier is recovered to identify the actual analog signal that has been received. The TSID is cross referenced in the VCT to obtain the channel data for the analog signal. The channel data thereby obtained is used to display information (i.e., service characteristics) about the analog programming service.

Comparable transport stream identifiers may also be assigned to the digital programming services. The digital TSIDs are similarly used to obtain associated channel data for the digital programming services. In this manner, service characteristics of the digital services can be displayed to the viewer.

A corresponding apparatus and receiver are also presented.

DETAILED DESCRIPTION OF THE INVENTION

Figure 1:
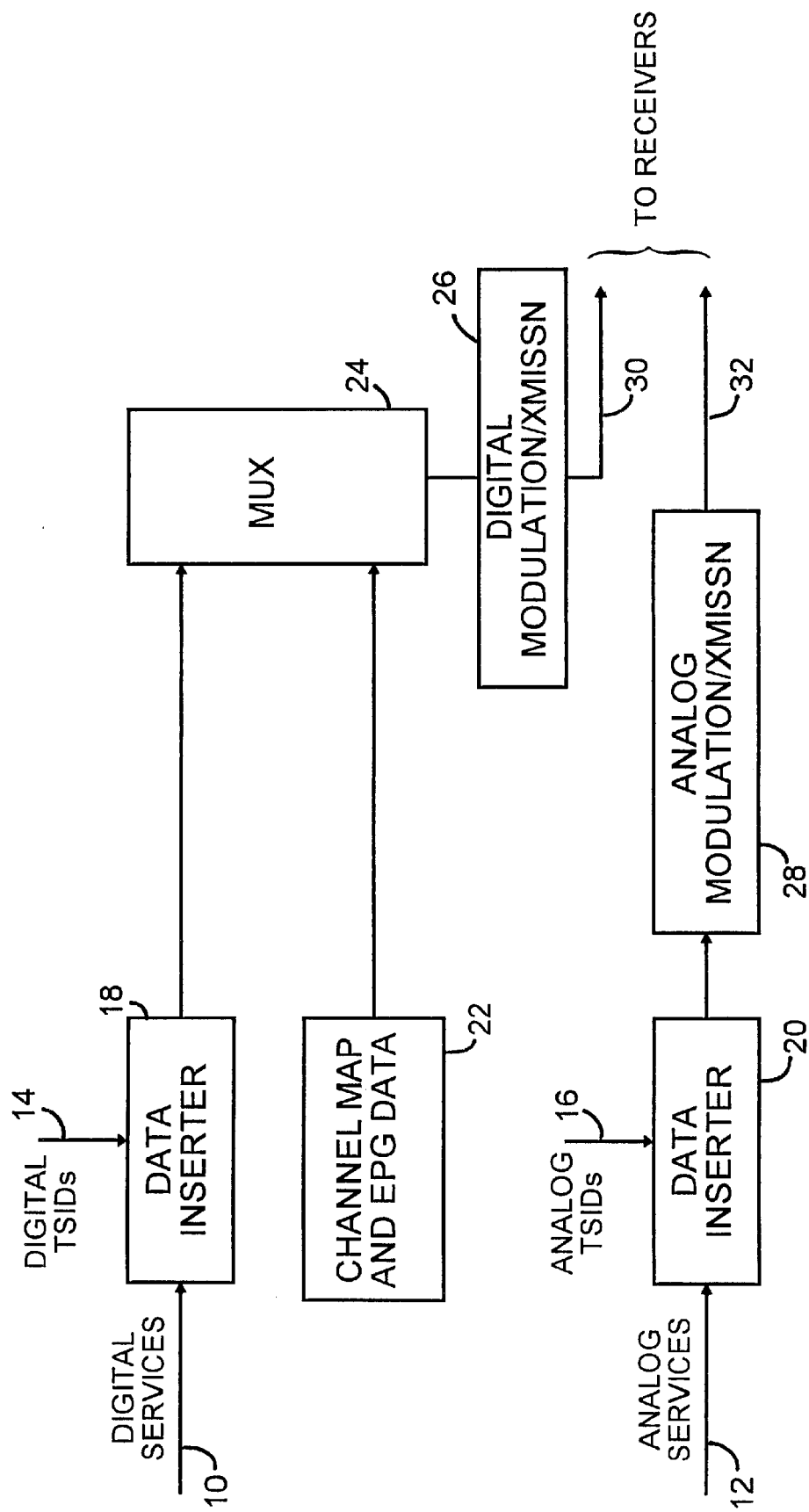
FIG. 1 illustrates an encoder in accordance with the present invention.

In accordance with the present invention, a transmission signal identifier (TSID) tag is inserted into a blanking interval of a conventional analog television signal. The television signal can comprise, for example, a standard NTSC television signal with the TSID inserted as data in the VBI according to any known VBI data insertion technique. For example, closed captioning, Vertical Interval Test Signal (VITS), auxiliary real time video, and Automated Measurement of Line-up (AMOL) data is conventionally carried in the VBI. It will be appreciated that the tag data can alternatively be inserted into the horizontal blanking interval in accordance with known techniques.

The use of TSIDs is known in connection with digital television signals, where the TSID is used to uniquely identify different digital signals carried in a network of such signals. In order to cross-reference the known digital TSIDs to relevant information such as service characteristics (e.g., channel name and number, program title, schedule information, etc.) of a particular television program or service, at least one look up table such as a virtual channel table, EIT, and/or ETT is typically used.

The analog TSID of the present invention is different from the digital TSID used, e.g., in the MPEG-2 standard. In a preferred embodiment of the invention, the analog TSID makes use of the extended data service (XDS) mode of incorporating data into an analog television signal. XDS is a data service on field 2 of line 21 of a television signal. This portion of the television waveform is currently used to supply program-related and other information to a viewer. For example, XDS provides a transport mechanism for information such as advisories regarding program content, current program title, length of show, type of show, time left in show, or weather alert information.

In the ATSC A/65 Program and System Information Protocol standard, a Terrestrial Virtual Channel Table is defined for identifying service characteristics of terrestrial digital and analog television signals. The TVCT defines the names and physical locations of available programming services. Specifically, each TVCT record provides: (1) the textual name of the channel (e.g., "WJLA") , (2) the major and minor channel number (e.g., "7.3") , (3) the service type (e.g., analog or digital television, audio only, data such as stock prices or weather data), (4) the frequency of the carrier within which the service can typically be found (e.g., 54–60 MHz), (5) the MPEG-2 program number (for digital services), and (6) for digital services, the channel's digital TSID.

The channel's digital TSID is used to allow the receiver to unambiguously identify a reference to a digital multiplex other than the one carrying the TVCT. Checking such a reference upon acquisition of a signal provides assurance that the channel name and EPG data actually corresponds to the received signal.

In accordance with the present invention, the definition of a channel's TSID is modified to allow an optional reference to an analog channel's TSID. The syntax of the TVCT is unchanged; however, the semantics of the MPEG field "channel_TSID" change to describe that field's use with analog channels.

In accordance with the invention, a terrestrial broadcaster can optionally insert the analog TSID into the analog signal, e.g., in XDS packets in the VBI of transmitted television signals. The television signals may, for example, comprise signals conforming to the NTSC standard or another analog television standard such as PAL or SECAM. The broadcaster can then set this analog TSID value in the channel_TSID field in the transmitted TVCT. When tuned to analog waveforms, a digital television receiver implementing the present invention will filter XDS packets looking for an analog TSID. If an analog TSID is found, the receiver uses this to display the appropriate channel name, program title, schedule information, and/or other information available.

In the United States, the Federal Communications Commission is expected to be called upon to assign analog TSIDs, just as they have been for digital TSIDs. Alternatively, the analog TSID could be made equivalent to the MPEG-2 digital TSID field that the broadcaster will use for the digital transmission. Any assignment technique used must ensure that the analog TSIDs are unique so that the analog channels can be distinguished from one another.

One possible syntax for carrying the analog TSID bits is shown in Table 1. In this example, the TSID is sixteen bits in length, and the bits are labeled $t_0$ to $t_{15}$. Character $b_6$ is set high for non-ASCII characters. The various bits can be set to identify an accompanying analog program using a variety of schemes.

TABLE 1

| Character | $b_6$ | $b_5$ | $b_4$ | $b_3$ | $b_2$ | $b_1$ | $b_0$ |
| --- | --- | --- | --- | --- | --- | --- | --- |
| TSID ($t_{3-0}$) | 1 | — | — | $t_3$ | $t_2$ | $t_1$ | $t_0$ |
| TSID ($t_{7-4}$) | 1 | — | — | $t_7$ | $t_6$ | $t_5$ | $t_4$ |
| TSID ($t_{11-8}$) | 1 | — | — | $t_{11}$ | $t_{10}$ | $t_9$ | $t_8$ |
| TSID ($t_{15-12}$) | 1 | — | — | $t_{15}$ | $t_{14}$ | $t_{13}$ | $t_{12}$ |

FIG. 1 illustrates an encoder in accordance with the present invention. The digital and analog portions of the encoder may actually be two different components located at two different sites. In particular, the analog encoding will most likely be performed at a terrestrial broadcast facility, although it may alternatively be located at a cable television headend, for example. The digital encoding will be performed at a site where the digital services are available for processing, such as at a satellite uplink or cable television headend. This may be the same site or a different site than where the analog services are encoded.

Data representative of digital services is input to a digital TSID data inserter 18 via line 10. The data inserter 18 receives the digital TSIDs via line 14. Similarly, analog service signals are input to an analog TSID data inserter 20 via line 12. The analog TSIDs are provided to inserter 20 via line 16.

The output of digital TSID inserter 18 is combined with channel map data from a memory 22 in a multiplexer (MUX) 24. EPG data, when present, is also provided by memory 22. It is noted that the channel map and the EPG data can be physically located in the same memory or separate memories. The channel map and EPG data correlates the analog and digital TSIDs to service characteristics such as channel name and number, program title, schedule information, etc.

It should be appreciated that an analog service may be the counterpart of a digital service. For example, both a standard quality analog version and a higher quality digital version of the same service, such as the Home Box Office (HBO) movie service, can be provided. In such a case, it is possible for the analog and digital TSIDs to be identical. However, a more likely scenario would be for the analog and digital TSIDs to be non-identical, but related. For example, the analog and digital TSIDs for counterpart services may differ only by a least significant bit. Alternatively, the analog and digital TSIDs may be completely independent, even where the associated services are the counterparts of one another.

The combined digital services and channel map and EPG data is provided by MUX 24 to conventional digital modulation and transmission components 26. These components modulate the digital data multiplex onto an appropriate carrier for transmission to a universe of receivers, such as digital television receivers or set-top boxes.

It is noted that the channel map and EPG data transmitted with the digital multiplex pertains both to the digital services and the analog services. It will be appreciated that the particular technique for delivering the channel map and EPG data to a decoder population is not important. For example, instead of multiplexing this data with the digital services, it can be transmitted on an entirely separate communication path. The channel map and EPG data could even be delivered on a magnetic or optical media such as tape, disk or CD ROM, although this is unlikely.

The analog service signals, after insertion of the analog TSIDs by inserter 20, are used to modulate a radio frequency carrier for terrestrial transmission in a conventional manner by analog modulation and transmission components 28. As indicated in FIG. 1, the transmitted digital and analog signals are communicated to the population of receivers on respective communication paths 30 and 32. Path 30 may comprise one or more of a digital cable television network, satellite communication channel, multipoint microwave distribution system (MMDS) or the like. As already indicated, path 32 will comprise a conventional terrestrial transmission path.

Figure 2:
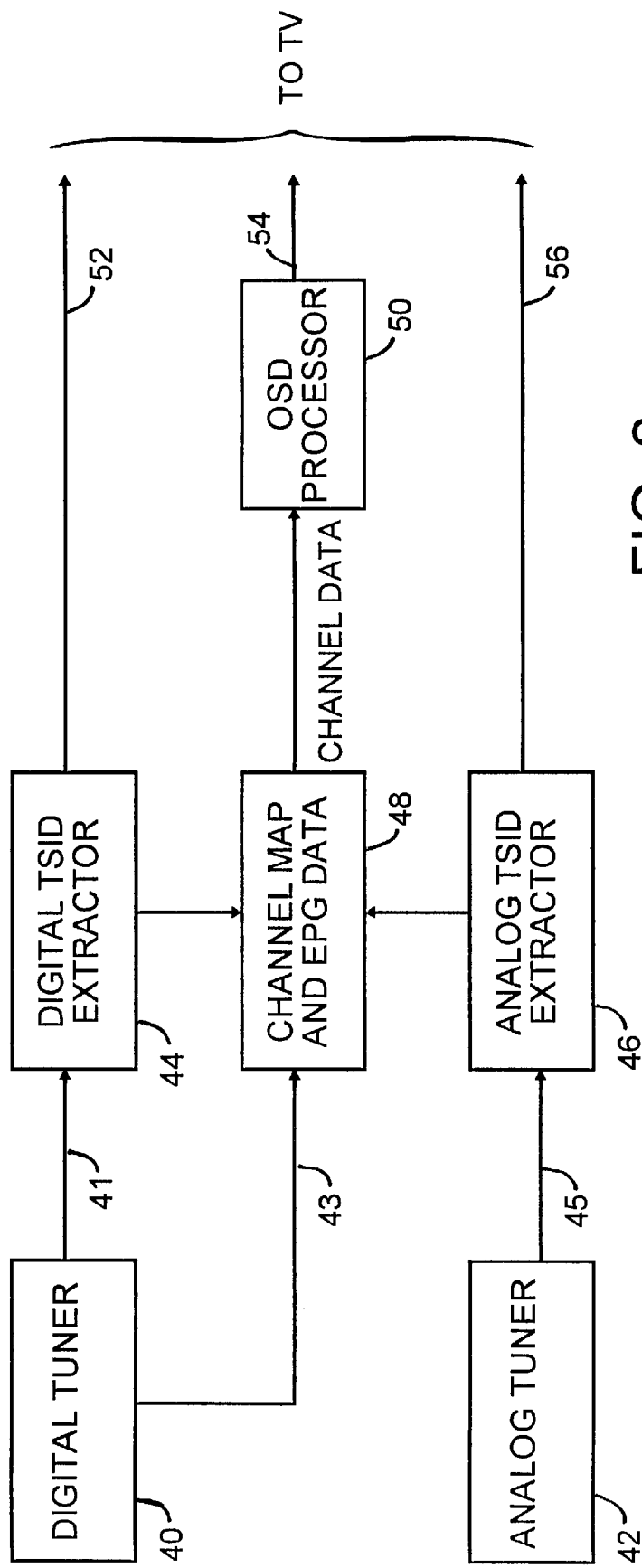
FIG. 2 illustrates a corresponding decoder.

FIG. 2 illustrates a receiver in accordance with the present invention. The receiver may be a set-top box or cable television converter which is used in an individual's home. A cable television converter adapted to operate in accordance with the present invention may output analog television signals (e.g., NTSC) to a legacy television set. Alternatively, the receiver may be integrated with a viewer's television set, personal computer, or other video appliance.

The receiver includes both a digital tuner 40 and an analog tuner 42. The digital tuner is used to recover a desired digital service from the digital signal multiplex carried on communication path 30 of FIG. 1. Likewise, the analog tuner is used to recover a desired analog channel signal from the analog transmission path 32 of FIG. 1.

The digital tuner 40 provides the data stream for a selected digital service to a digital TSID extractor 44, which locates the TSID for the selected service and provides it as an address to a receiver channel map and EPG data memory 48. The digital tuner also acquires the channel map and EPG data, if present in the digital multiplex received via communication path 30, and provides it for storage in the channel map and EPG data memory 48 via line 43. In the event that the channel map and/or EPG data is communicated via a different communication path (not shown), the data is provided for storage in the channel map memory 48 from whatever receiver or data reader obtains it.

The analog tuner provides a selected analog channel signal to an analog TSID extractor 46, which locates any TSID in the analog waveform (e.g., in the VBI) and passes the TSID as an address to the channel map and EPG data memory. By using the TSIDs to address the channel map and EPG data memory, channel data pertaining to the service carrying the TSID is easily accessed. It should be understood that while the TSID can be used to directly address the channel map and EPG data memory, this is not the only possible implementation. For example, the TSID can be further processed by any suitable means to convert it into (or to generate) an address for the channel map and EPG data memory. Moreover, the channel map and the EPG data can be stored in a single memory component or in separate memories.

As indicated above, the channel map and EPG data stored in the memory 48 cross-references TSIDs to specific service characteristics (e.g., channel name and number, program title, schedule information, etc.) which pertain to the service identified by the TSID. The channel map and EPG data memory provides channel data identifying the service characteristics to an on-screen display (OSD) processor 50. OSD processor 50 provides textual and/or graphical data via line 54 in an appropriate format (e.g., raster scan) for display on a viewer's television. In this manner, the service characteristics of the selected service, which may be either an analog service or a digital service, are available for display to the television viewer.

The selected digital or analog service is also output to the viewer's television. In particular, when a digital service is selected, the corresponding data stream is passed through the digital TSID extractor 44 to the television via line 52. It will be understood by those skilled in the art that if the television itself does not contain all of the necessary data processing circuitry to properly decode and display the selected data stream, the necessary conventional circuitry will be provided within path 52, even though it is not illustrated in FIG. 2.

When an analog service is selected, the analog signal is passed through analog TSID extractor 46 to the viewer's television via path 56. As with the digital services, if any further processing (e.g., descrambling) of the analog signal is required prior to delivery to the television set, such processing can be performed by conventional components (not shown) within path 56.

As an enhancement to the operation described above, the receiver may use a learning algorithm where it sequentially steps through each standard 6 MHz television frequency band and takes note of the values of any analog or digital TSIDs that are present. The learning mode may be entered when a user selects an associated function from an on-screen menu or remote control key input. Alternatively, the learning mode may be entered automatically when the television is turned off. The latter alternative is preferable because it will allow the receiver to have an up-to-date set of channel map and program guide data tables when the consumer turns it back on. Once the television receiver learns the relationship between TSIDs and frequencies in this manner, navigation can operate based on the TSID values and not based on frequencies that might be communicated via a virtual channel table. The learning algorithm can be provided as part of the digital and/or analog TSID extractors 44, 46 respectively.

In another implementation, the receiver may use TSID values found at the time of acquisition of an analog or digital waveform to verify that the waveform is indeed the one expected at that frequency. Once the TSID is processed, data related to that signal may be displayed, if available, by cross-referencing the TSID value encountered with stored VCT and electronic program guide data referencing that TSID.

Accordingly, it can be seen that the present invention provides a system for positively identifying an analog television signal that is received over the air, so that characteristics of the service provided by the signal can be determined by reference to a channel map and EPG data provided via other means. A transmission signal identifier is inserted into the analog service at the transmitter side, and extracted at the receiver side. Channel map and/or EPG data that is used for identifying digital programming services is thus extended to encompass identification of one or more analog programming services. Descriptive information which is specific to the programming services can thereby be accurately matched up and displayed with an analog or digital programming service selected for viewing.

One application for the invention is to enable the proper identification of analog signals that are broadcast concurrently with counterpart digital signals carrying the same service. Without the invention, analog services that are broadcast terrestrially may be misidentified if the only means for identification is the channel frequency on which the services are received.

The invention is also applicable to cable television systems. In cable television systems, it is generally assumed that the service received on a particular channel is the service that belongs on that channel. However, this is not always the case. For example, a cable operator may send an analog transmission received on channel 39 down the cable on channel 7, without updating the VCT data necessary to properly identify the transmitted service. If a digital counterpart of the channel 39 signal has associated system information that points to channel 39 as the analog equivalent, the television processing the system information would not find the analog service; it would look for the service on channel 39 and not on channel 7. This erroneous result would not occur if the analog signal carried its own TSID in accordance with the present invention, because the television would be able to figure out that the signal it finds on channel 7 is the one being referenced.

In a similar manner, the invention enables the proper identification of terrestrial broadcast analog services moved to a nonstandard frequency by a "broadcast translator", e.g., to avoid reception problems peculiar to a particular geographic condition.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for positively identifying an analog service to enable characteristics thereof to be obtained from a digital source independent of the analog service, comprising the steps of:

providing channel data via said digital source;

inserting a transmission signal identifier into said analog service for communication with the analog service to a receiver;

recovering said transmission signal identifier from said analog service at said receiver; and using the recovered transmission signal identifier to access channel data provided by said digital source, said channel data correlating the recovered transmission signal identifier with a service characteristic of the analog service.

2. The method of claim 1, wherein:

said analog service comprises an analog television signal; and said inserting step inserts said transmission signal identifier into a blanking interval of the analog television signal.

3. The method of claim 2 wherein said digital source includes a memory at said receiver for storing channel data obtained from a digital television signal transport stream.

4. The method of claim 2 wherein said analog television signal is a counterpart of a digital television signal in said digital television signal transport stream.

5. The method of claim 1, comprising the further steps of:

providing a digital service to said receiver in addition to said analog service;

identifying a digital transport stream carrying said digital service with a transport stream identifier; and providing channel data via said digital source which correlates said transport stream identifier with a service characteristic of said digital service.

6. The method of claim 5, wherein:

said analog service comprises an analog television signal;

said digital service comprises a digital television signal that is a counterpart of said analog television signal.

7. The method of claim 1, wherein:

said service characteristic comprises a frequency location in which said analog service is communicated to said receiver.

8. Apparatus for positively identifying an analog service which is communicated to a receiver, wherein descriptive information for said analog service is independently communicated to said receiver via a digital source, comprising:

a data inserter for inserting a transmission signal identifier into said analog service;

means for transmitting said analog service to said receiver with the inserted transmission signal identifier; and means for independently communicating channel data from said digital source to said receiver for correlating said transmission signal identifier with a service characteristic of said analog service.

9. The apparatus of claim 8, further comprising:

a data extractor for extracting said transmission signal identifier from said analog service at said receiver; and a memory for storing said channel data at said receiver, said memory being responsive to the extracted transmission signal identifier for providing said service characteristic of said analog service.

10. The apparatus of claim 8, further comprising:

a data inserter for inserting a transport stream identifier into a digital service carried in a digital transport stream;

means for transmitting said digital service to said receiver with the inserted transport stream identifier;

wherein said channel data correlates said transport stream identifier with a service characteristic of said digital service.

11. The apparatus of claim 10 wherein said analog service is a counterpart of said digital service, and said transmission signal identifier of said analog service is related to the transport stream identifier of said digital service.

12. A method for positively identifying received analog services to enable characteristics thereof to be obtained, comprising the steps of:

detecting a transmission signal identifier associated with a received analog service;

correlating the detected transmission signal identifier with the channel frequency on which the associated analog service is provided; and storing data indicative of the correlation between the detected transmission signal identifier and channel frequency, said data being received via a digital source independently from said analog service;

wherein the stored data is subsequently used to access characteristics of the analog service received on said channel frequency.

13. A method in accordance with claim 12 comprising the further step of:

sequentially stepping through a plurality of standard channel frequencies on which said analog services are provided to detect different transmission signal identifiers associated with different received analog services;

wherein each detected transmission signal identifier is correlated with the channel frequency on which it is received, and stored data relating to the correlations is subsequently used to access characteristics of an analog service received on a particular channel frequency.

14. Apparatus for receiving analog and digital television signals comprising:

an analog tuner for selecting an analog television signal;

a digital tuner for selecting a digital television signal;

means for recovering an analog transmission signal identifier when an analog television signal is selected, said identifier being carried in the selected analog signal;

means for recovering a digital transport stream identifier when a digital television signal is selected, said identifier being associated with the selected digital signal; and a memory for storing at least one of channel map and electronic program guide data cross-referencing analog transmission signal identifiers and digital transport stream identifiers with service characteristics of said analog and digital signals, respectively;

wherein said at least one of channel map and electronic program guide data is received by said receiving apparatus independently of said analog television signals.

15. Apparatus in accordance with claim 14 wherein said channel map is received in a digital transport stream.

16. Apparatus in accordance with claim 14 further comprising:

a processor for processing channel data output from said memory in response to (i) a received analog transmission signal identifier or (ii) a received digital transport stream identifier, to provide service characteristics of a selected analog or digital signal to a television viewer.

17. A method for communicating analog and digital services, comprising the steps of:

providing at least one digital service in a transport stream of a digital multiplex;

identifying said transport stream by a transport stream identifier;

providing at least one analog service independently of said digital multiplex;

identifying said analog service by a transmission signal identifier carried with the analog service;

providing data correlating said transport stream identifier and said transmission signal identifier with service characteristics of the respective digital and analog services, wherein said data is provided in said digital multiplex independently of said analog service.

18. A method in accordance with claim 17 wherein:

an analog service is a counterpart of a digital service carried in said digital multiplex; and the transmission signal identifier of said analog service is related to the transport stream identifier of the counterpart digital service.

* * * * *